United States Patent

[11] 3,591,796

[72] Inventor John Scott Netherwood Barker
 Southampton, England
[21] Appl. No 765,193
[22] Filed Oct. 4, 1968
[45] Patented July 6, 1971
[73] Assignee Bardic Systems Limited
 Northam, Southampton, England
[32] Priority Oct. 5, 1967
[33] Great Britain
[31] 45,601/67

[54] EMERGENCY ELECTRIC LIGHTING INSTALLATIONS
 3 Claims, 4 Drawing Figs.
[52] U.S. Cl. .................................................. 240/37.1,
 240/10.6, 315/86
[51] Int. Cl. ..................................................... F21v 9/04
[50] Field of Search ....................................... 240/37.1,
 10.6, 10.5, 8.18, 11.2; 315/86, 87, 88, 89, 90

[56] References Cited
UNITED STATES PATENTS
2,863,038 12/1958 Lombardo .................. 240/37.1
3,217,156 11/1965 Sherwood ................... 240/10.6
3,233,091 2/1966 Hunt ............................ 240/37.1 X Primary Examiner—Samuel S. Matthews
Assistant Examiner—Richard L. Moses
Attorney—Watson, Cole, Grindle and Watson ABSTRACT: A portable handlamp incorporating a rechargeable battery is removably mounted in a bracket to form an emergency electric lighting installation. It incorporates a transformer and rectifier arranged to trickle charge the battery from a supply, and the transformer acts on an armature secured to a bolt to lock the lamp in the bracket so long as the supply is maintained, but to switch on the light and release the lock if the supply fails.

PATENTED JUL 6 1971

INVENTOR
John S. N. Barker
BY
Watson, Cole, Grindle & Watson
ATTORNEY

EMERGENCY ELECTRIC LIGHTING INSTALLATIONS

This invention relates to emergency electric lighting installations of the type including supply terminals, a rechargeable battery, a lamp, means for connecting the battery so as normally to be trickle charged from the supply terminals, and means responsive to failure of the supply for automatically connecting the lamp to the battery to provide an emergency lighting unit.

According to the present invention the installation comprises a fixed portion or racket including the supply terminals and a portable portion or handlamp including the battery and the lamp, which is readily detachable from the fixed portion to form a portable lighting unit, but is locked to the fixed portion by locking means responsive to failure of the supply so as to release the portable handlamp, as well as illuminating the lamp, if the supply fails.

The means for recharging the battery preferably include a transformer which also functions as a solenoid to keep the locking means engaged while the supply is maintained.

In one form of the invention, in which the transformer is carried by the handlamp, the transformer functions as a relay to actuate contacts to illuminate the lamp.

The arrangement has the advantage that the handlamp cannot be removed from its racket during normal conditions and hence is always available in emergency if the supply should fail, and can then be withdrawn from its racket and used wherever it may be needed.

The invention may be put into practice in various ways but one specific embodiment will be described by way of example with reference to the accompanying drawings in which.

Figure 1:
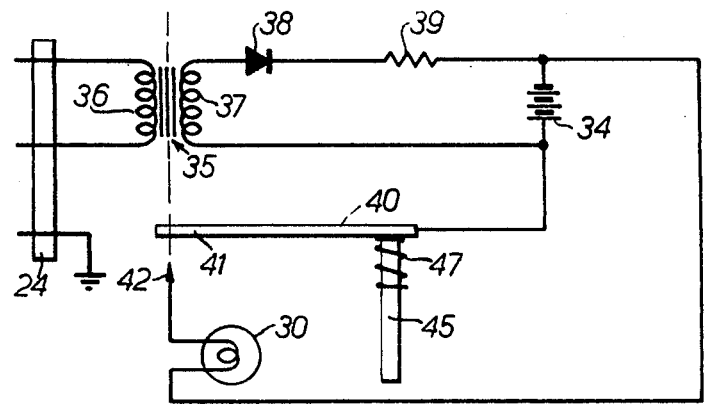
FIG. 1 is a circuit diagram.
Figure 3:
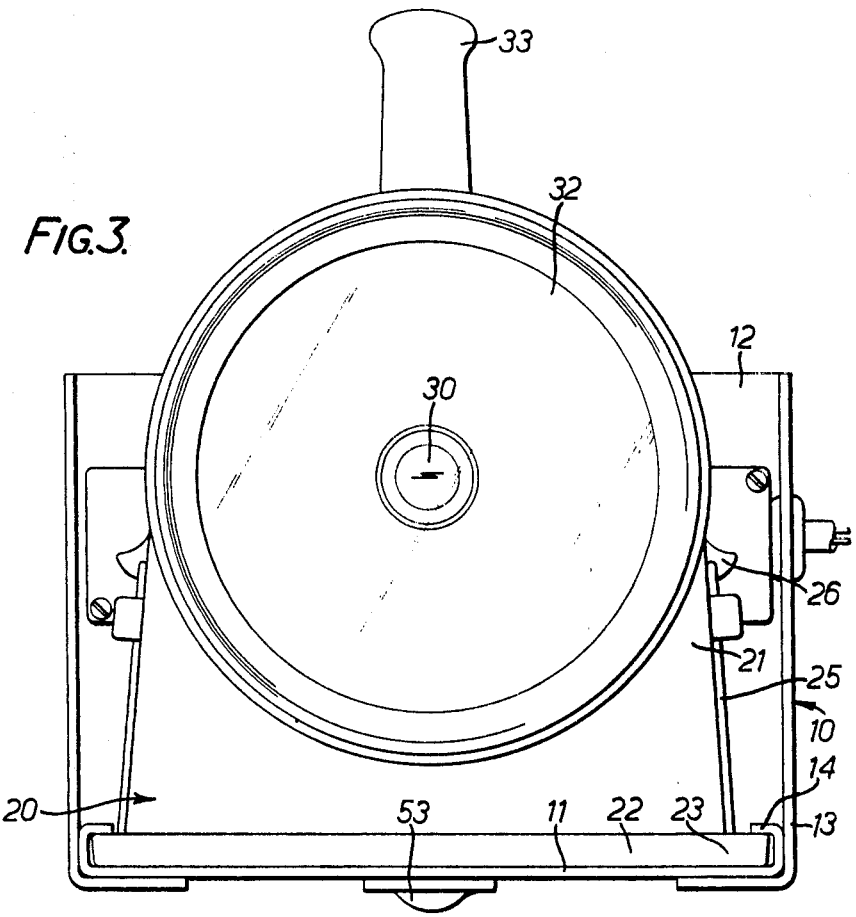
FIG. 3 is a front elevation of an emergency electric lighting installation embodying the invention, and FIG. 4 a rear elevation of the handlamp.

The installation comprises a fixed portion or bracket 10 and a portable portion or handlamp 20. The bracket is arranged to be secured to a bench or wall and comprises a bottom 11, a back 12 and triangular sidewalls 13.

The handlamp comprises a cast casing 21 with a removable bottom 22 the sides 23 of which project slightly beyond the casing and are received under a pair of horizontal ribs 14 on the sidewalls of the bracket. Thus the handlamp can slide horizontally into the bracket in what will be referred to as a rearward direction. The handlamp has at the back a plug 24 to cooperate with a socket 15 carried by the bracket and connected to supply mains. The bottom of the handlamp is secured to the casing by a pair of hooked wire clips 25 each pivoted to a slide 26 which can be drawn up by a screw 27 and nut 28 to hold the bottom firmly.

Figure 2:
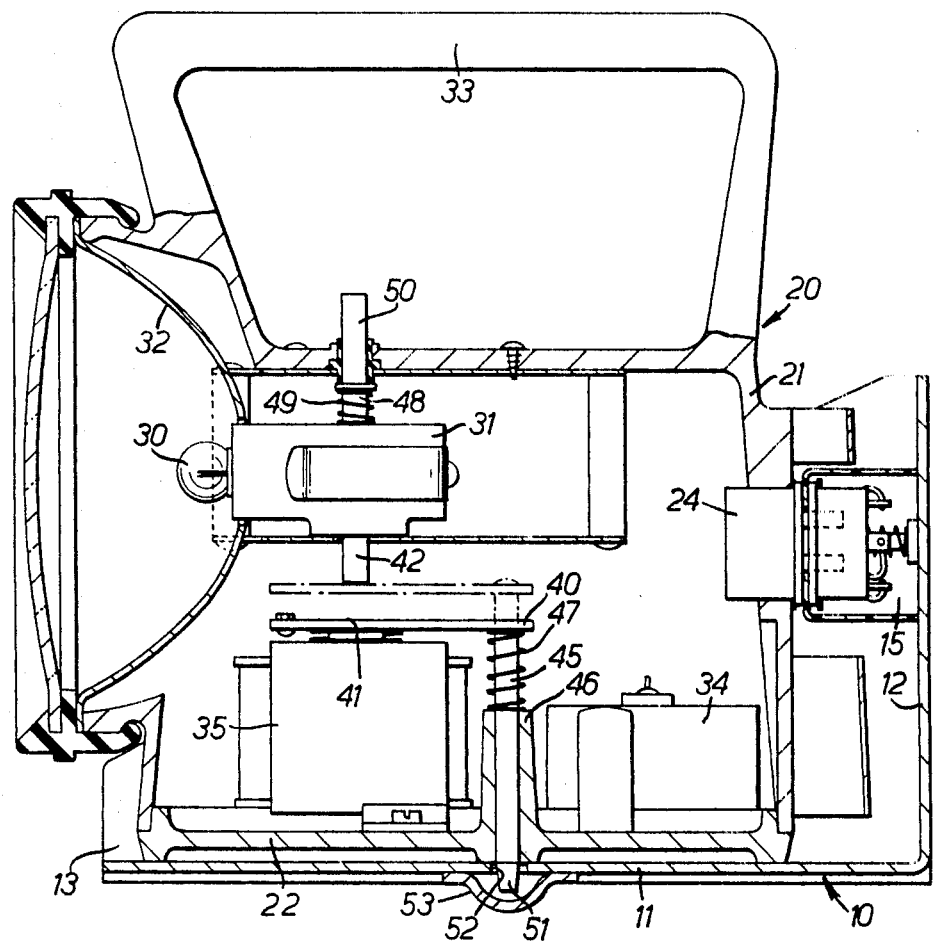
FIG. 2 is a somewhat diagrammatic side elevation, partly in section.
Figure 4:
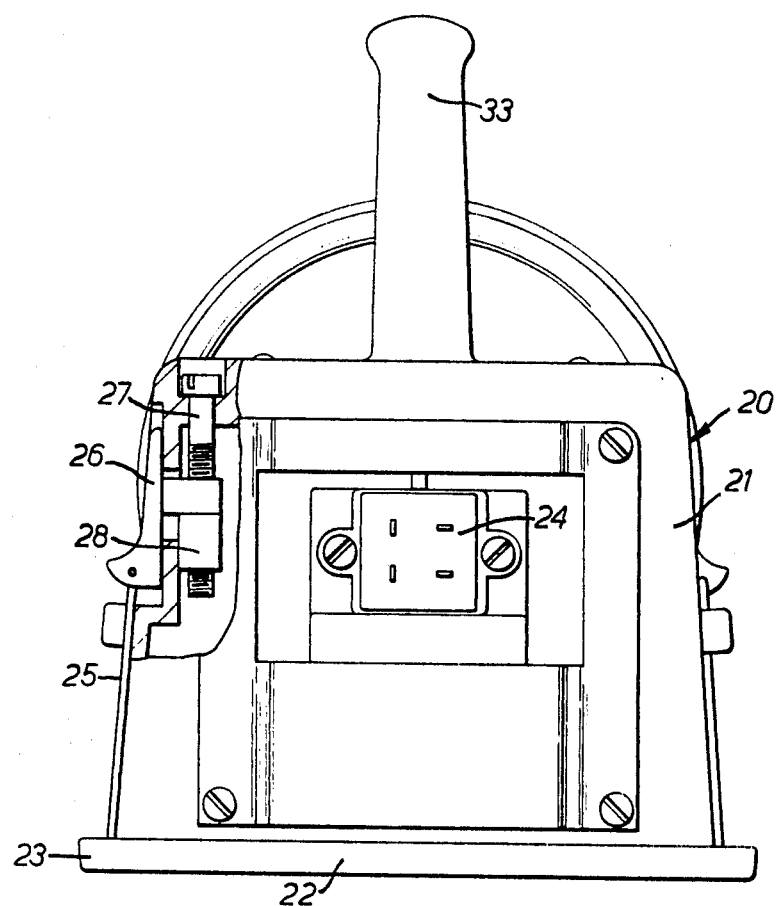

At the front the handlamp has a lamp 30 in a holder 31 fitted with a reflector 32, and along the top a carrying handle 33. Within the body of the handlamp is a nickel-cadmium battery 34 and a combined transformer, relay and lock 35. The transformer has a primary winding 36 connected to the plug 24, and a secondary winding 37 connected through a half-wave rectifier 38 and a resistor 39 to the battery 34 to trickle-charge it. In addition the transformer core acts on a relay armature 40 carrying a contact 41 cooperating with a contact 42 to connect the lamp across the battery, the armature 40 also acting on a locking bolt 45. Thus the armature 40 by carried by the bolt 45 which is mounted to slide in a guide sleeve 46 upstanding from, and formed integraly with, the bottom 22. A helical spring 47 urges the bolt upwards. The contact 41 is formed by the armature itself whilst the contact 42 is formed by the lower end of a rod 48 mounted to slide in the lamp holder 31 and urged upwards by a spring 49 acting on a collar secured to it. The upper end of the rod 48 extends through a hole in the top of the casing and forms a button 50. Thus in normal operation the transformer is energized and pulls the armature 40 down (against the action of the spring 47) to a lower position shown in full lines in FIG. 2 in which the contacts 41 and 42 are separated and the lower end 51 of the bolt 45 projects through a hole 52 in the bottom 11 of the bracket to lock the handlamp in position. The hole 52 is masked by a domed cover 53 to prevent access to the lower end 51 of the bolt to release it. When the transformer is deenergized the spring 47 raises the armature to the position shown in chain lines, in which the contacts 41 and 42 are in engagement. In addition if the transformer is energized and the armature is in its lower full-line position, the button 50 can be pressed to lower the rod 48 and bring the contact 42 into engagement with the contact 41 for testing purposes.

Thus so long as the supply s maintained the transformer is energized and the armature acts on the bolt 45 to cause it to project through the bottom of the handlamp, and through the hole 52 in the bracket, thereby preventing the handlamp from being drawn forward from the bracket. The contacts 41 and 42 remain open to disconnect the lamp from the battery, and the battery receives a slow trickle charge.

In the event of the supply failing, the transformer is deenergized and the locking bolt is withdrawn by the spring 47 so that the handlamp can be withdrawn from the bracket for use wherever it is required. At the same time, the armature causes the contacts 41 and 42 to close, whereby the lamp is automatically illuminated, whether the lamp is withdrawn or left in place in the bracket.

On the supply being restored and the lamp being returned to the bracket, or if the lamp has already been returned to the bracket, the transformer will be reenergized to open the lamp contacts 41 and 42 and relock the handlamp in position.

Thus during normal conditions the handlamp remains locked to the bracket so that it cannot be removed or disconnected from the trickle-charging circuit, and it will thus always be available in its place and fully charged when required in an emergency.

What I claim as my invention and desire to secure by Letters Patent is:

1. An emergency electric lighting installation of the type including supply terminals, a rechargeable battery, a lamp, means for connecting the battery so as normally to be trickle charged from the supply terminals and means responsive to failure of the supply for automatically connecting said lamp to said battery to provide an emergency lighting unit, in which the installation comprises a fixed bracket including said supply terminals and a handlamp including said battery and said lamp, which is readily detachable from said fixed bracket to form a portable lighting unit, and locking means responsive to failure of the supply for locking said headlamp to said fixed bracket and for releasing said portable handlamp, as well as illuminating said lamp, if the supply fails.

2. An emergency electric lighting installation as claimed in claim 1 in which means for recharging battery include a transformer which also functions as a solenoid to keep said locking means engaged while the supply is maintained.

3. An emergency electric lighting installation as claimed in claim 2 in which said transformer is carried by said handlamp, and said transformer functions as a relay to actuate contacts to illuminate said lamp.